United States Patent [19]

Telford

[11] 4,365,696
[45] Dec. 28, 1982

[54] ONE-PIECE LOCKING CLUTCH

[75] Inventor: Thomas M. Telford, Gladstone, Oreg.

[73] Assignee: Warn Industries, Inc., Kent, Wash.

[21] Appl. No.: 209,647

[22] Filed: Nov. 24, 1980

[51] Int. Cl.³ .................................................. F16D 11/04
[52] U.S. Cl. ...................................... 192/67 R; 192/94;
192/112; 403/1; 403/326
[58] Field of Search .................... 192/67 R, 94, 112;
403/1, 326, DIG. 7

[56] References Cited
U.S. PATENT DOCUMENTS

| | | | |
|---|---|---|---|
| 3,442,361 | 5/1969 | Hegar | 192/67 R |
| 4,212,557 | 7/1980 | Overbeek | 192/67 R X |
| 4,266,646 | 5/1981 | Telford | 192/67 R |
| 4,281,601 | 8/1981 | Overman | 403/326 X |

Primary Examiner—Allan D. Herrmann
Attorney, Agent, or Firm—Graybeal & Uhlir

[57] ABSTRACT

An improvement to a clutch housing, including a clutch mechanism manually operable to lock and unlock the vehicle axle to the vehicle wheel hub, is disclosed. The improvement comprises the clutch housing attachable to the vehicle wheel hub by a lock ring disposed around the clutch housing. The lock ring engages an annular groove within the vehicle wheel hub allowing the clutch housing to be secured to the wheel hub.

7 Claims, 4 Drawing Figures

ONE-PIECE LOCKING CLUTCH

FIELD OF THE INVENTION

The invention relates, in general, to clutch means, and more particularly, to an improvement in vehicle clutch means enabling the clutch mechanism to be completely assembled prior to being attached to the vehicle.

BACKGROUND ART

The majority of four-wheel drive type vehicles employ a front driving axle having a wheel hub into which the clutch mechanism is subsequently assembled. The clutch mechanism typically is assembled within that portion of the wheel hub extending outwardly beyond the vehicle wheel. First, the clutch mechanism body subassembly is inserted into the wheel hub to internal wheel hub splines with mutually complementary splines on the exterior of the body subassembly. After the body subassembly is engaged to the wheel hub, lock rings or the like, are inserted around the inside surface of the wheel hub adjacent the body subassembly both to secure the body subassembly, and to prevent axial movement of the subassembly within the wheel hub. The remaining subassemblies of the clutch mechanism, including the mechanism which locks and unlocks the vehicle axle to the vehicle hub, are next inserted and assembled within the wheel hub. Finally, the clutch mechanism housing, such as a cap or the like, is secured to the wheel hub by means which are old per se, such as bolts, screws, or the like.

To repair the clutch mechanism, or to perform routine maintenance on the subassemblies, the clutch cap assembly first is removed to expose the clutch mechanism's subassemblies. For example, to repair the body subassembly, the cap is removed, and the mechanism which locks and unlocks the vehicle axle to the vehicle wheel is subsequently removed to expose the body subassembly lock rings. The lock rings are thereafter removed to access the body subassembly. This process can be time-consuming, since the lock rings or snap rings have to be pried out of engagement with the wheel hub by the use of small, sharp-pointed instruments such as screwdrivers or the like. Repair is further complicated since the snap rings are tightly secured within the wheel hub, in small and confining spaces.

Four-wheel drive vehicle manufacturers are interested in clutch mechanisms which allow simple and quick insertion into the vehicle front driving axles at the place of vehicle manufacture. In essence, the vehicle manufacturers would like to integrate the assembly of the locking clutch with their assembly of the vehicle. It is therefore desirable that the clutch mechanism, and its associated housing be preassembled so that the assembly of the mechanism with the vehicle front driving axle can be quick and simple, with the clutch mechanism having minimal susceptibility to being damaged or otherwise rendered inoperable during integration and assembly with the vehicle.

The present invention provides a clutch housing, including a preassembled clutch mechanism operable to lock and unlock the vehicle front driving axle to the vehicle wheel hub, which is specifically adapted for assembly to a four-wheel drive type vehicle front driving axle in a one step operation. By utilizing a compressible lock ring having an outside diameter slightly larger than the inside diameter of the vehicle wheel hub disposed around the clutch housing, the clutch housing of the present invention in inserted within the wheel hub to engage the lock ring to the wheel hub. When the lock ring is engaged, the clutch housing, including the preassembled clutch mechanism, is secured to the vehicle front driving axle. For removal to facilitate repair or the like, the cap screws securing a cover or clutch cap to the vehicle wheel hub are removed. The clutch cap is subsequently withdrawn allowing the compressible lock ring to have a diameter slightly smaller than the inside diameter of the wheel hub. The remainder of the clutch mechanism subassemblies may then be withdrawn in one piece with the locking ring of the present invention.

SUMMARY OF THE INVENTION

According to one aspect of the present invention, an improvement in a clutch housing, including a preassembled clutch mechanism manually operable to lock and unlock the vehicle axle to the vehicle wheel hub comprises a lock ring disposed around the clutch housing. The lock ring engages an annular groove within the vehicle wheel hub when the clutch housing is inserted within the wheel hub. When engaged to the annular groove, the lock ring secures the clutch housing to the vehicle wheel hub, thereby allowing the clutch housing, including the mechanism locking and unlocking the vehicle wheel to the vehicle wheel hub, to be attached to the vehicle wheel hub in a single operation.

It is an object of the present invention to provide a preassembled clutch mechanism which can be easily and quickly attached to a vehicle wheel hub.

Another object of the present invention is to provide a preassembled clutch mechanism which can be assembled to a vehicle wheel hub in a single operation.

A still further object of the present invention is to provide a preassembled clutch mechanism easily and quickly removable from the vehicle wheel hub to facilitate repair.

These, and other objects, features, and advantages of the present invention will become more apparent in the light of the following detailed description of a preferred embodiment as illustrated in the accompanying drawings.

DESCRIPTION OF THE PREFERRED EMBODIMENT

Figure 1:
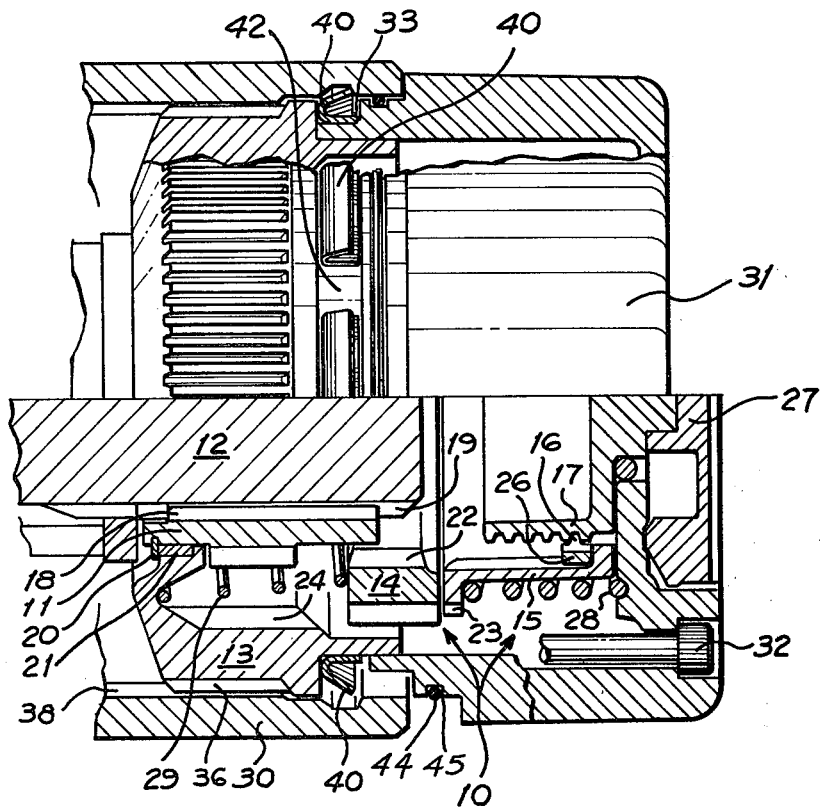
FIG. 1 is a typical split side view of the present invention, with portions broken away for clarity, showing the present invention inserted into a typical vehicle wheel hub, and being removed from a typical vehicle wheel hub.

With reference to FIG. 1, the clutch mechanism of the present invention is generally shown at 10. The clutch mechanism is included within a clutch housing which is secured to the vehicle wheel hub 30 by a lock ring 40 disposed around the clutch housing which engages an annular groove within the vehicle wheel hub.

The clutch mechanism forms the subject matter of U.S. Pat. No. 4,266,646, entitled Wheel Stud Mounted Locking Clutch, issued to applicant on May 12, 1981, and generally comprises plural clutch mechanism subassemblies, including an axle shaft hub 11 coaxially disposed about the vehicle axle shaft 12 and in splined engagement with the vehicle axle shaft. An outer body 13 is coaxially disposed about, and in spaced apart relation from the axle shaft hub 11, and is in splined engagement with the vehicle wheel hub 30. A manually activated locking means subassembly is generally disposed adjacent the vehicle axle shaft 12. The manually activated locking means subassembly comprises a clutch ring 14 slidably splined to the inside surface of the outer body 13, and slidably engageable to the axle shaft hub 11. A clutch cup 15 is disposed adjacent the clutch ring 14 and is slidably splined to the inside surface of the outer body 13. A clutch nut 16 is disposed within the clutch cup and is slidably splined to the clutch cup 16. The clutch nut is in threaded engagement with a dial screw 17 disposed adjacent the axle shaft hub 11 and spaced apart from the axle shaft hub 11.

With reference to FIG. 1, the manually activated locking means will next be described. The axle shaft hub 11 is coaxially disposed about a portion of the vehicle axle shaft 12, and is in engagement therewith by a plurality of splines 18 circumferentially disposed coaxially along the inside surface of the axle shaft hub 11. These splines 18 engage a corresponding plurality of splines 19 disposed coaxially around a portion of the outside surface of the vehicle axle shaft 12. A retaining ring 20, and a thrust washer 21 are disposed at one end of the axle shaft hub 11 adjacent the outer body 13 permitting the outer body to rotate with respect to the axle shaft hub. The clutch ring 14 is disposed circumferentially around the inside surface of the outer body at one end of the axial shaft hub 11, and is in axially slidable splined engagement with the outer body by a plurality of splines 22 disposed circumferentially around the outside surface of the clutch ring 14. The clutch ring 14 is manually urgable into splined engagement with the axial shaft hub 11, thereby locking the axial shaft hub to the vehicle wheel hub 30 as will be discussed. The clutch cup 15 is in splined engagement with the outer body 13 through a plurality of splines 23 disposed circumferentially around the outside surface of the clutch cup engaging a corresponding plurality of splines 24 disposed upon the inside surface of the outer body. The clutch cup also has a plurality of splines 25 disposed circumferentially around the inside surface which engage a corresponding plurality of splines 26 disposed circumferentially around the outside surface of the clutch nut 16. The clutch nut 16 is in threaded engagement with the dial screw 17 by mutually engaged threads disposed circumferentially around the clutch nut and the dial screw. It can be seen that the clutch cup 15 and the clutch ring 14 are both moved axially along the inside surface of the outer body 13 as the dial member is manually rotated, as for example, by rotating dial member 27.

An engagement spring 28, disposed between the clutch cup 15 and the dial member 27, urges the clutch ring 14 into splined engagement with the vehicle axle shaft hub 11 as the dial member is rotated to the lock position. A disengagement spring 29 disposed between the clutch ring 14 and the outer body 13 urges the clutch ring into a disengaged relationship with the axle shaft hub as the dial screw member is rotated from the lock position to the unlock position.

With the clutch mechanism in the lock mode of operation, the slidable clutch ring 14 is urged into splined engagement with the axle shaft hub 11 by the clutch cup 15 and the engagement spring 28. In this mode of operation, the clutch ring is simultaneously splined to both the axle shaft hub 11 and the outer body 13 producing a continuous lock-up between the axle shaft hub, the outer body, and the vehicle wheel hub 30 for all rotational speeds therebetween. If the clutch ring does not immediately become splined to the vehicle axle shaft hub, as may occur when splines on the axle shaft are misaligned with respect to splines disposed around the inside surface of the clutch ring, continued rotation of the dial member 27 causes the clutch nut 16 to be displaced axially along the splines disposed along the inside surface of the clutch cup 15. When alignment of the splines on the axle shaft hub 11 and the clutch ring 14 occurs, the engagement spring 28 urges the clutch ring into splined engagement with the axle shaft hub, and the clutch cup into an abutting relation with the clutch nut.

When the dial member 27 and the dial indicator (not shown) are rotated from the lock position to the unlock position, the dial screw 17 pulls the clutch nut 16 and the clutch cup 15 axially away from the clutch ring 14 thereby compressing the engagement spring 28. When this occurs the disengagement spring 29 expands, forcing the clutch ring 14 axially along the splines disposed within the inside surface of the outer body 13 and out of splined engagement with the axle shaft hub 11. The axle shaft hub is then free to rotate with respect to the wheel.

The clutch housing of the present invention typically comprises a clutch cap 31 and the outer body 13. The clutch cap is secured to the clutch mechanism by a plurality of cap screws 32 disposed circumferentially around the clutch cap 31 extending through the clutch cap 31. As has been described above, disposed within the clutch cap is a portion of the clutch mechanism locking and unlocking the vehicle axle to the vehicle wheel hub.

Figure 2:
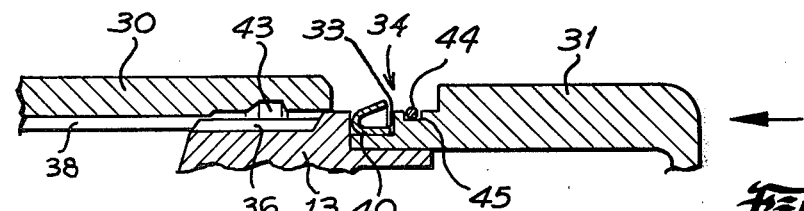
FIG. 2 is an enlarged side view of the present invention showing the clutch housing being inserted into a typical vehicle wheel hub.

With reference to FIG. 2, the clutch cap 31 abuts and is secured to the clutch mechanism outer body 13. At the end of the clutch cap abutting the outer body is a flange 34 which, in conjunction with the clutch cap and outer body, forms an annular groove 33 between the clutch cap 31 and the outer body 13. Disposed within the annular groove is a compressible lock ring 40 having a substantially C-shaped cross section. As can be seen with reference to FIG. 1, the lock ring 40 is segmented with a gap shown generally at 42. In its natural, or at rest state, the outside diameter of the lock ring 40 is somewhat smaller than the inside diameter of the wheel hub 30. The gap 42 within the lock ring allows the lock ring outside diameter to be expanded when the lock ring is carried circumferentially within the annular groove 33 in the clutch mechanism housing. When the lock ring 40 is disposed around the clutch housing, its outside diameter is slightly larger than the inside diameter of the wheel hub 30. In the preferred embodiment, the lock ring is constructed from sheet metal, steel, or the like. An O-ring type seal 44 is in close proximity to the lock ring 40 and is carried within an annular groove 45 in the clutch cap 31. The seal ensures that dirt and other debris will not inadvertently work its way into the vehicle wheel hub 30 after the present invention is secured to the wheel hub.

Figure 3:
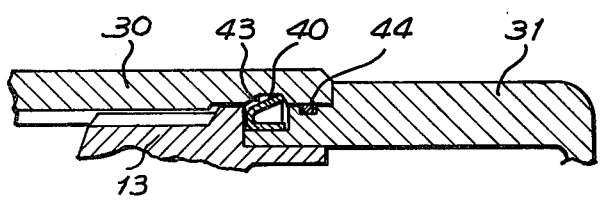
FIG. 3 is an enlarged side view of the present invention showing the clutch housing assembled to a typical vehicle wheel hub.
Figure 4:
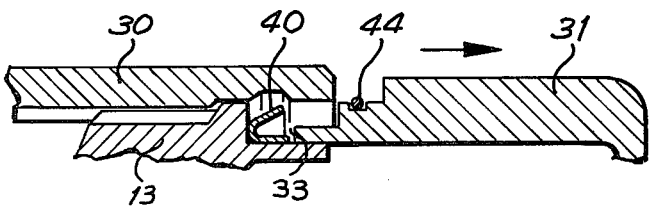
FIG. 4 is an enlarged side view of the present invention showing a portion of the clutch housing being removed from a typical vehicle wheel hub.

With reference to FIGS. 2–4, the assembly of the clutch mechanism, including the clutch housing to a typical vehicle wheel hub is next described. To assemble the clutch housing to the wheel hub 30, the outer body 13 is first inserted within the wheel hub 11. As this occurs, the axially extending splines circumferentially disposed around the inside surface of the axle shaft hub 11 engage the complementary spline extending axially around the vehicle axle shaft 12. When these splines 18 and 19 are in meshing relationship with each other, the clutch housing is further urged into the vehicle wheel hub. As this occurs, the splines 36 extending axially circumferentially around the outside surface of the outer body mesh with complementary splines 38 extending axially around the inside surface of the vehicle wheel hub. Further forward movement of the clutch housing causes the inside surface of the wheel hub 30 to engage the lock ring 40, thereby compressing the lock ring inwardly due to the fact the outside diameter of the lock ring is larger than the inside diameter of the wheel hub. With reference to FIG. 3, as the clutch housing is further inserted within the wheel hub, the clutch cap 31 abuts the wheel hub 30 as the lock ring 40 engages the groove 43 disposed circumferentially around the inside surface of the wheel hub. At this point, the lock ring 40 expands to engage one edge of the annular groove 43 within the wheel hub 30, thereby securing the clutch housing including the clutch mechanism to the wheel hub.

To remove the clutch mechanism from the wheel hub, such as to facilitate, repair or the like, the clutch cap 31 is first removed. This is accomplished by removing the plurality of cap screws 32 extending through the clutch cap securing the clutch cap to the outer body 13. When this has been accomplished, the clutch cap 31 is pulled outwardly away from the wheel hub (see FIG. 4) until it is separated from the outer body 13. At this point, the lock ring 40 assumes a natural state and is urged radially inwardly out of engagement with one edge of the annular groove 43 disposed within the vehicle wheel hub. When the clutch cap 31 has been completely removed from the vehicle wheel hub 30, the lock ring 40 engages and is carried by the outer body 13.

Removal of the lock ring 40 is then accomplished with any convenient tool, such as with the use of a pair of pliers or the like. After the lock ring 40 has been removed, the clutch mechanism subassemblies may easily and quickly be removed to facilitate repair.

I claim:

1. In combination with a vehicle wheel hub of the type having an opening for insertion of a clutch mechanism, a clutch housing including a clutch mechanism operable to lock and unlock the vehicle axle to the vehicle wheel hub, said clutch housing being secured to the vehicle wheel hub by a lock ring disposed around the clutch housing engaging an annular groove within the vehicle wheel hub opening, said lock ring in its at rest state having an outside diameter smaller than the inside diameter of the vehicle wheel hub opening.

2. The combination of claim 1, wherein the lock ring has substantially a C-shaped cross section.

3. The combination of claim 1, wherein the outer diameter of the lock ring when disposed around the clutch housing is expanded to have an outer diameter greater than the inside diameter of the vehicle wheel hub opening.

4. The combination of claim 1, wherein the lock ring is segmented.

5. A housing for a clutch mechanism locking and unlocking the vehicle axle to the vehicle wheel hub for use with a vehicle wheel hub of the type having an opening for insertion of the clutch mechanism, said housing being secured to the vehicle wheel hub by a lock ring disposed around the housing engaging an annular groove within the vehicle wheel hub opening, and said lock ring in its at rest state having an outside diameter smaller than the inside diameter of the vehicle wheel hub opening.

6. The housing of claim 5, wherein the outside diameter of the lock ring when disposed around the clutch housing is expanded to have an outer diameter greater than the inside diameter of the vehicle wheel hub opening.

7. The housing of claim 5, wherein the lock ring is segmented.

* * * * *